M. R. COVERT.
VEHICLE SPRING.
APPLICATION FILED MAY 18, 1915.
1,178,783.
Patented Apr. 11, 1916.
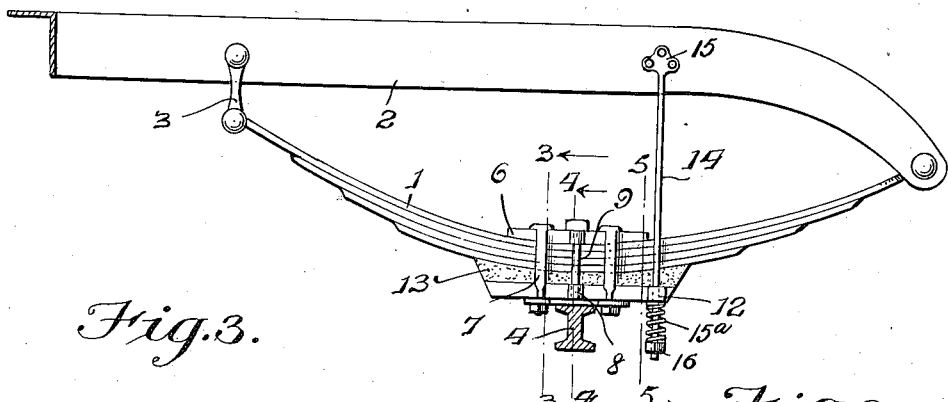
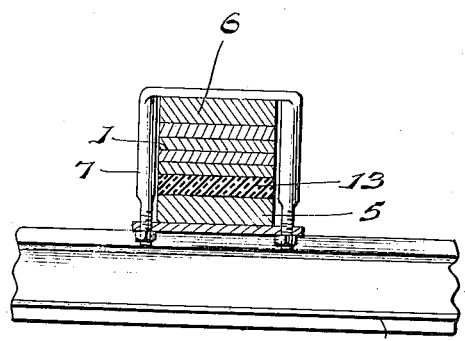
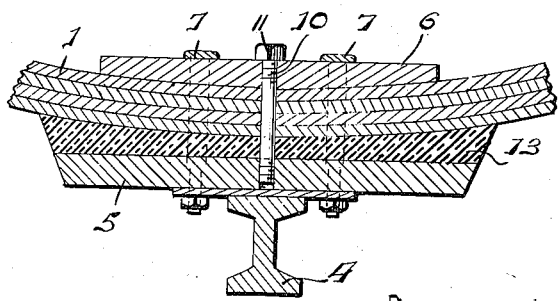
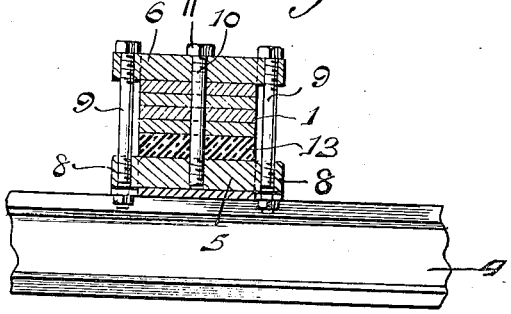
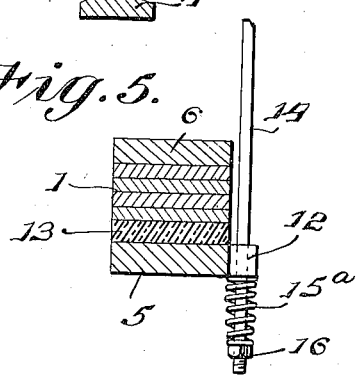
Inventor
M. R. Covert.
By ............, Attorneys

UNITED STATES PATENT OFFICE.

MATTHEW R. COVERT, OF ASBURY PARK, NEW JERSEY.

VEHICLE-SPRING.

1,178,783.  Specification of Letters Patent.  Patented Apr. 11, 1916.

Application filed May 18, 1915. Serial No. 28,909.

*To all whom it may concern:*

Be it known that I, MATTHEW R. COVERT, a citizen of the United States, residing at Asbury Park, in the county of Monmouth and State of New Jersey, have invented certain new and useful Improvements in Vehicle-Springs, of which the following is a specification.

The invention aims to prevent the crippling of vehicle springs either by rebound or by the yielding action of the spring when compensating for vibration and jolt.

The invention consists of a yieldable seat for the spring to form a cushion and avoid overstraining of the spring when the same is subjected to unusual movement either by the wheel of the vehicle passing over an obstruction or dropping into a rut or depression.

The invention, furthermore, provides a bridle to limit the movement of the spring upon a rebound, thereby preventing injury thereto from such cause.

The invention also consists of a novel mount and connections for the spring whereby the same is attached to the axle in a manner to distribute the strain and load and whereby the breaking of the spring or elements thereof at a central point is guarded against and practically wholly prevented.

With these and other objects in view, which will readily appear as the nature of the invention is better understood, the same consists in the improved construction and novel arrangement and combination of parts which will be hereinafter fully described and particularly claimed.

In the accompanying drawings has been illustrated a simple and preferred form of the invention, it being, however, understood that no limitation is necessarily made to the precise structural details therein exhibited, but that changes, alterations and modifications within the scope of the invention as claimed may be resorted to when desired.

Referring to the drawings, Figure 1 is a view in elevation of a vehicle spring as generally applied to a motor vehicle; Fig. 2 is a central longitudinal section; Fig. 3 is a transverse section on the line 3—3 of Fig. 1 looking to the left; Fig. 4 is a section on the line 4—4 of Fig. 1 looking to the left; Fig. 5 is a transverse section on the line 5—5 of Fig. 1 looking to the right.

Corresponding and like parts are referred to in the following description and indicated in all the views of the drawings, by the same reference characters.

The vehicle spring may be of any type such as generally employed for the various makes of vehicles whether motor propelled or horse drawn. Inasmuch as the invention is of especial advantage for springs applied to motor vehicles it is shown in such adaptation in the accompanying drawing. The spring 1 is of the type comprising a plurality of leaves and is bowed or of semi-elliptic shape. The numeral 2 designates the side bar of the chassis of a motor vehicle, the forward end of such bar being curved downwardly and such bar having a bracket 3 depending therefrom a short distance from its forward end. The spring 1 is connected at its ends to the bracket 3 and the downwardly curved end of the bar 2. The axle 4 is connected to the spring 1 at a central point. A plate 5 is interposed between the spring 1 and axle 4 and constitutes a seat for the spring. A second plate 6 is placed upon the spring in vertical line with the axle plate 5 and is connected thereto by means of clips 7 which embrace opposite sides of the spring 1 and extend along opposite edges of the upper and lower plates 6 and 5, respectively. Each of the plates 5 and 6 is formed intermediate of its ends with outwardly extending ears 8 which are apertured to receive bolts 9. These plates are also formed at a central point with openings 10 through which a pin or bolt 11 passes, such fastening likewise extending through openings formed in the several leaves comprising the spring and serving to hold such leaves in a given position. The axle plate 5 is somewhat longer than the upper or confining plate 6 so as to permit ample support for the spring and prevent injury thereto. The axle plate 5 is also formed with an ear 12 which is vertically apertured, such ear being preferably disposed at one end of the plate so as not to obstruct the fastenings connecting the plates 5 and 6.

A cushion 13 is placed upon the axle plate 5 and forms a yielding bed for the spring 1. The cushion 13 may be of any suitable material which will absorb shock and vibration. It is preferred to construct the cushion 13 of rubber although any yieldable material may be utilized for the purpose. The lower face of the cushion 13 is flat to conform to the upper flat face of the axle plate 5. The upper face of the cushion 13 is longitudinally depressed or of concave outline to conform to the shape of the lower side of the spring 1. As a result of forming the cushion 13 in the manner stated its middle portion is comparatively thin whereas its end portions are thickened to conform to the shape of the space between the axle plate 5 and spring 1. The amplitude of movement of the end portions of the spring increases from the center of the spring toward its extremities, hence the advantage of interposing a greater amount of cushioning material between the end portions of the plate 5 and spring 1 than between the center portions of such plate and spring. In practice the interposition of the cushion between the axle plate and spring has resulted in materially prolonging the period of service of the spring besides preventing excessive wear upon the vehicle and appurtenances as also adding materially to the comfort of the occupant by absorbing shock in vibration.

A bridle 14 is interposed between the spring 1 and bar 2 or like part for the purpose of limiting the rebound after the vehicle has passed over an obstruction or dropped into a rut or depression. The bridle 14 consists of a rod or like part which is attached at one end to the bar 2, as indicated at 15 and which has its opposite end passing through the opening of the ear 12, such bridle projecting below the ear 12 and receiving a spring 15$^a$ and nut 16. The spring 15$^a$ partakes of the nature of a buffer and may be of any construction. The nut 16 constitutes a stop for limiting the action of the bridle. The nut 16 may be adjusted so as to vary the action of the bridle to meet existing conditions. During the ordinary action of the spring the lower portion of the rod or bridle 14 plays through the opening of the ear 12 but in the event of a violent movement resulting from a wheel of the vehicle passing over an obstruction or dropping into a rut or depression the rebound is limited by the bridle and the action of the latter is not sudden by reason of the buffer 15$^a$ which absorbs the shock and provides a yielding stop to cushion the impact.

It will be understood from the foregoing that the invention provides for cushioning the action of the spring in every direction so as to prevent overstraining thereof thereby guarding against injury to the spring from a violent action in either direction, the cushion 13 preventing overstraining of the spring when carrying the rod and the bridle preventing injury incident to a rebound.

Having thus described the invention, what is claimed as new is:—

In combination, a supporting member, a vehicle spring connected at its ends to the supporting member, an axle plate formed with offstanding apertured ears, a cushion between the axle plate and spring, a fastening connecting the spring to the axle plate and passing through an ear of the latter, a bridle connected at one end to the supporting member and passing through the remaining apertured ear of the axle plate, and a buffer and stop mounted upon the projecting end of the bridle.

In testimony whereof I affix my signature.

MATTHEW R. COVERT. [L. s.]